(12) United States Patent
Arsenault et al.

(10) Patent No.: US 11,548,625 B2
(45) Date of Patent: Jan. 10, 2023

(54) AIRCRAFT BRAKE SYSTEM

(71) Applicant: GOODRICH CORPORATION, Charlotte, NC (US)

(72) Inventors: Tyler Arsenault, Dayton, OH (US); Naison E. Mastrocola, Goshen, CT (US); Marc Georgin, Dayton, OH (US); Resham Bains, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 115 days.

(21) Appl. No.: 16/713,366

(22) Filed: Dec. 13, 2019

(65) Prior Publication Data
US 2021/0179261 A1 Jun. 17, 2021

(51) Int. Cl.
  *B64C 25/44* (2006.01)
  *B60T 8/17* (2006.01)
  *B60T 8/32* (2006.01)

(52) U.S. Cl.
  CPC ............ *B64C 25/44* (2013.01); *B60T 8/1703* (2013.01); *B60T 8/325* (2013.01); *B60T 8/326* (2013.01); *B60T 2270/88* (2013.01)

(58) Field of Classification Search
  None
  See application file for complete search history.

(56) References Cited

U.S. PATENT DOCUMENTS

| | | | |
|---|---|---|---|
| 4,822,113 A | 4/1989 | Amberg et al. | |
| 5,417,477 A | 5/1995 | Lasbleis | |
| 5,539,642 A | 7/1996 | Wiel | |
| 6,234,585 B1* | 5/2001 | Harris | B60T 8/4072 |
| | | | 303/155 |
| 8,332,114 B2 | 12/2012 | Whittingham | |
| 9,387,840 B1 | 7/2016 | Cahill et al. | |
| 2004/0239173 A1 | 12/2004 | Williams et al. | |
| 2005/0035320 A1* | 2/2005 | Tsuchiya | G05D 7/0641 |
| | | | 251/129.02 |
| 2007/0210208 A1 | 9/2007 | Miller | |
| 2011/0178687 A1* | 7/2011 | Anderson | B60T 13/745 |
| | | | 701/70 |

FOREIGN PATENT DOCUMENTS

| | | |
|---|---|---|
| EP | 3501927 | 6/2019 |
| EP | 3594076 | 1/2020 |

OTHER PUBLICATIONS

European Patent Office, European Search Report dated May 3, 2021 in Application No. 20213915.0.

* cited by examiner

*Primary Examiner* — Adam D Tissot
(74) *Attorney, Agent, or Firm* — Snell & Wilmer L.L.P.

(57) ABSTRACT

A braking system is disclosed. In various embodiments, the braking system includes a brake stack; an actuator configured to apply a compressive load to the brake stack; a servo valve coupled to a power source and to the actuator; and a brake control unit configured to operate the servo valve at a current ramp rate in response to a pedal deflection signal, wherein the current ramp rate is determined via a relationship between the current ramp rate and a brake pressure command signal.

20 Claims, 6 Drawing Sheets ated by the transducer connected to the brake pedal in response to a first brake pedal deflection or a second brake pedal deflection and wherein the current ramp rate corresponds with one of a first brake pressure command signal or a second brake pressure command signal generated by the

AIRCRAFT BRAKE SYSTEM

FIELD

The present disclosure relates to aircraft wheel and brake systems and, more particularly, to systems and methods for reducing the effect of brake fill following a brake activation.

BACKGROUND

Aircraft typically utilize brake systems on wheels to slow or stop the aircraft during landings, taxiing and emergency situations, such as, for example, a rejected takeoff (RTO), which generally refers to engagement of a brake system during an aborted takeoff and involves high braking loads over a short time period, resulting in a rapid increase in the brake temperature. The brake systems generally employ a heat sink comprising a series of friction disks, sandwiched between a pressure plate and an end plate, that may be forced into sliding contact with one another during a brake application to slow or stop the aircraft. A typical hydraulic brake system may include, without limitation, a source of pressurized hydraulic fluid, an actuator for exerting a force across the heat sink (e.g., across the pressure plate, the series of friction disks and the end plate), a valve for controlling a pressure level provided to the actuator and a brake control unit for receiving inputs from an operator and from various feedback mechanisms and for producing responsive outputs to the valve.

Upon activation of the brake system (e.g., by depressing a brake pedal), a pressurized fluid is applied to the actuator, which may comprise a piston configured to translate the pressure plate toward the end plate. Typically, there will, however, be some displacement of the brake components (e.g., translation of the piston and the various components of the heat sink) prior to a force being established across the components of the heat sink, at which point a brake force is exerted against the wheels to slow the aircraft. Consequently, a measured pressure level at the actuator and used for feedback to the brake control unit may be very low for a period of time until the force is actually established across the heat sink. As a result, there may exist a short period of time or a lag following activation of the brake system where a brake command signal output by the brake control unit does not generate an actual brake engagement.

The condition just described is sometimes referred to as brake fill. During the lag associated with brake fill, the brake control unit may instruct the valve (e.g., via a brake command signal) to open further in order to generate an actual brake engagement (e.g., a slowing torque applied to a wheel). This may occur, for example, if the brake control unit includes an integrator that accumulates the product of error and time. As time passes without error reduction (or without feedback indicating an actual brake engagement), the brake control unit may continue to increase the level of the brake command signal being output to the valve, thereby increasing the pressure level to the actuator. Once the force is finally established across the heat sink, an actual brake engagement will occur, but such will be in response to the increased brake command signal. The increased brake command signal is the result of the accumulated error during the brake fill condition and typically results in greater braking than is desired until the brake control unit recovers and outputs a reduced brake command signal more representative of a desired or input level of braking. Brake fill may thus result in unwanted grabbing or jerky brake performance and may be present with any type of braking system (e.g., hydraulic, pneumatic or electromechanical).

SUMMARY

A braking system is disclosed. In various embodiments, the braking system includes a brake stack; an actuator configured to apply a compressive load to the brake stack; a servo valve coupled to a power source and to the actuator; and a brake control unit configured to operate the servo valve at a current ramp rate in response to a pedal deflection signal, wherein the current ramp rate is determined via a relationship between the current ramp rate and a brake pressure command signal.

In various embodiments, the relationship provides distinct values for the current ramp rate on a curve of the current ramp rate versus the brake pressure command signal. In various embodiments, the curve of the current ramp rate versus the brake pressure command signal includes a smoothly varying function. In various embodiments, the curve of the current ramp rate versus the brake pressure command signal includes a step function. In various embodiments, the curve of the current ramp rate versus the brake pressure command signal includes a constant slope function.

In various embodiments, the pedal deflection signal is generated by a transducer connected to a brake pedal. In various embodiments, the current ramp rate corresponds with the brake pressure command signal generated by the brake control unit. In various embodiments, the pedal deflection signal is generated by the transducer connected to the brake pedal and the brake control unit is configured to convert the pedal deflection signal to the brake pressure command signal.

In various embodiments, a pressure sensor is coupled to the actuator and configured to provide a feedback signal to the brake control unit. In various embodiments, the power source is at least one of a hydraulic power source, an electric power source and a pneumatic power source. In various embodiments, the power source is a hydraulic power source.

A method of operating a braking system is disclosed. In various embodiments, the method includes generating a pedal deflection signal via a brake pedal; providing the pedal deflection signal to a brake control unit; determining by the brake control unit a brake pressure command signal based on the pedal deflection signal; and determining by the brake control unit an output current configured to operate a servo valve coupled to a brake actuator and to a power source, wherein the output current is increased at a current ramp rate based on the brake pressure command signal.

In various embodiments, the current ramp rate is determined via a relationship between the current ramp rate and the brake pressure command signal. In various embodiments, the relationship provides distinct values for the current ramp rate on a curve of the current ramp rate versus the brake pressure command signal.

In various embodiments, the pedal deflection signal is generated by a transducer connected to the brake pedal in response to a brake pedal deflection. In various embodiments, the pedal deflection signal is one of a first pedal deflection signal or a second pedal deflection signal generated by the transducer connected to the brake pedal in response to a first brake pedal deflection or a second brake pedal deflection and wherein the current ramp rate corresponds with one of a first brake pressure command signal or a second brake pressure command signal generated by the brake control unit in response to the first brake pedal deflection or the second brake pedal deflection.

In various embodiments, a pressure sensor is coupled to the brake actuator and configured to provide a feedback signal to the brake control unit. In various embodiments, the power source is a hydraulic power source.

A brake control unit, comprising a tangible, non-transitory memory and a processor is disclosed. In various embodiments, the brake control unit includes instructions stored thereon that, in response to execution by the processor, cause the brake control unit to perform a series of operations, including receiving a pedal deflection signal generated in response to a deflection of a brake pedal; determining a brake pressure command signal based on the pedal deflection signal; and determining an output current configured to operate a servo valve coupled to a brake actuator and to a power source, wherein the output current is increased at a current ramp rate based on the brake pressure command signal. In various embodiments, the current ramp rate is determined via a relationship between the current ramp rate and the brake pressure command signal, the relationship providing distinct values for the current ramp rate on a curve of the current ramp rate versus the brake pressure command signal.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
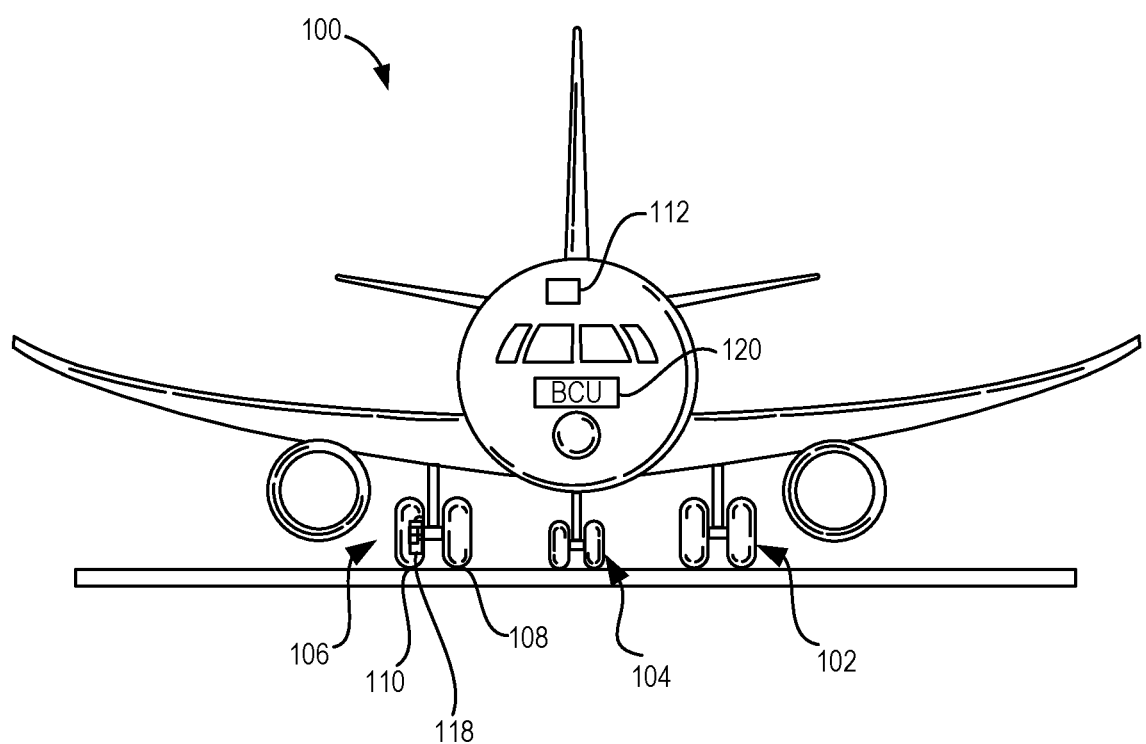
FIG. 1A illustrates an aircraft having multiple landing gear and brakes, in accordance with various embodiments.

Referring now to FIG. 1A, an aircraft 100 includes multiple landing gear systems, including a first landing gear 102, a second landing gear 104 and a third landing gear 106. The first landing gear 102, the second landing gear 104 and the third landing gear 106 each include one or more wheel assemblies. For example, the third landing gear 106 includes an inner wheel assembly 108 and an outer wheel assembly 110. The first landing gear 102, the second landing gear 104 and the third landing gear 106 support the aircraft 100 when the aircraft 100 is not flying, thereby enabling the aircraft 100 to take off, land and taxi without damaging the aircraft 100. In various embodiments, the second landing gear 104 is a nose landing gear for the aircraft 100 and, oftentimes, one or more of the first landing gear 102, the second landing gear 104 and the third landing gear 106 are operationally retractable into the aircraft 100 when the aircraft 100 is in flight or airborne.

In various embodiments, the aircraft 100 further includes an avionics unit 112, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA) or other programmable logic device, discrete gate, transistor logic, or discrete hardware components, or any various combinations thereof or the like. In various embodiments, the avionics unit 112 controls operation of various components of the aircraft 100. For example, the avionics unit 112 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems and the like.

Figure 1B:
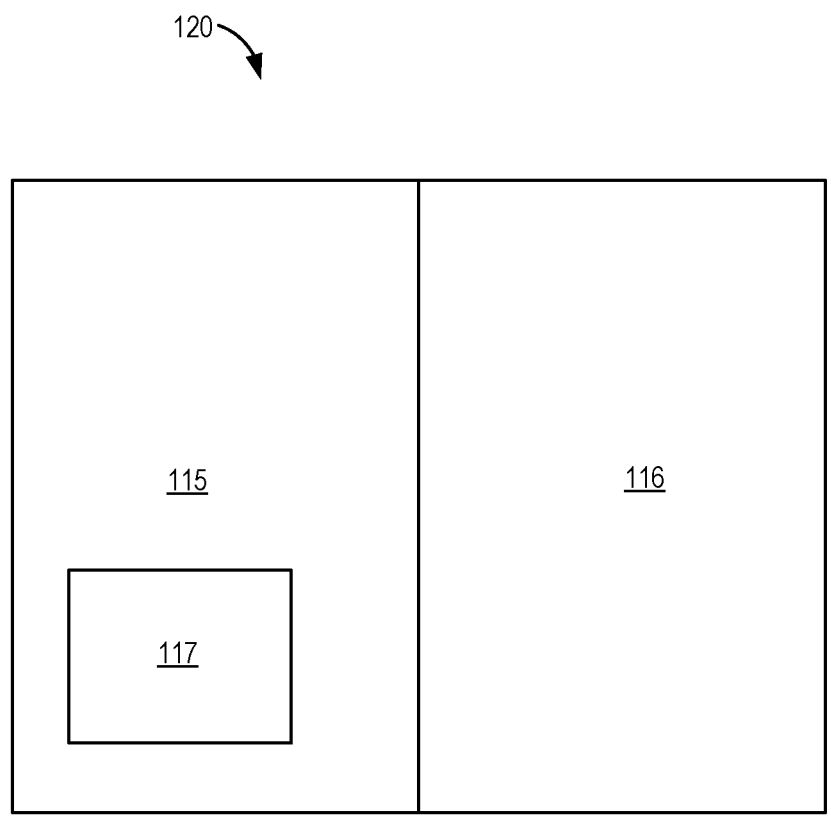
FIG. 1B is a block diagram of a brake control unit, in accordance with various embodiments.

In various embodiments, the aircraft 100 further includes a brake control unit (BCU) 120. With brief reference now to FIG. 1B, the BCU 120 includes one or more controllers 115 (e.g., processors) and one or more memories 116 (e.g., tangible, non-transitory memories) capable of implementing digital or programmatic logic. In various embodiments, for example, the one or more controllers 115 are one or more of a general purpose processor, DSP, ASIC, FPGA, or other programmable logic device, discrete gate, transistor logic, or discrete hardware components, or any various combinations thereof or the like, and the one or more memories 116 store instructions that are implemented by the one or more controllers 115 for performing various functions, such as adjusting the hydraulic pressure provided to a brake actuator depending on the degree of braking desired, as will be discussed herein. In various embodiments, the BCU 120 controls the braking of the aircraft 100. For example, the BCU 120 controls various parameters of braking, such as manual brake control, automatic brake control, antiskid braking, locked wheel protection, touchdown protection, emergency/park brake monitoring or gear retraction braking. The BCU 120 may further include hardware 117 capable of performing various logic using discreet power signals received from various aircraft systems. Referring again to FIG. 1A, the aircraft 100 further includes one or more brakes coupled to each wheel assembly. For example, a brake 118 is coupled to the outer wheel assembly 110 of the third landing gear 106 of the aircraft 100. During operation, the brake 118 applies a braking force to the outer wheel assembly 110 upon receiving a brake command from the BCU 120. In various embodiments, the outer wheel assembly 110 of the third landing gear 106 of the aircraft 100 comprises any number of wheels or brakes.

Figure 2:
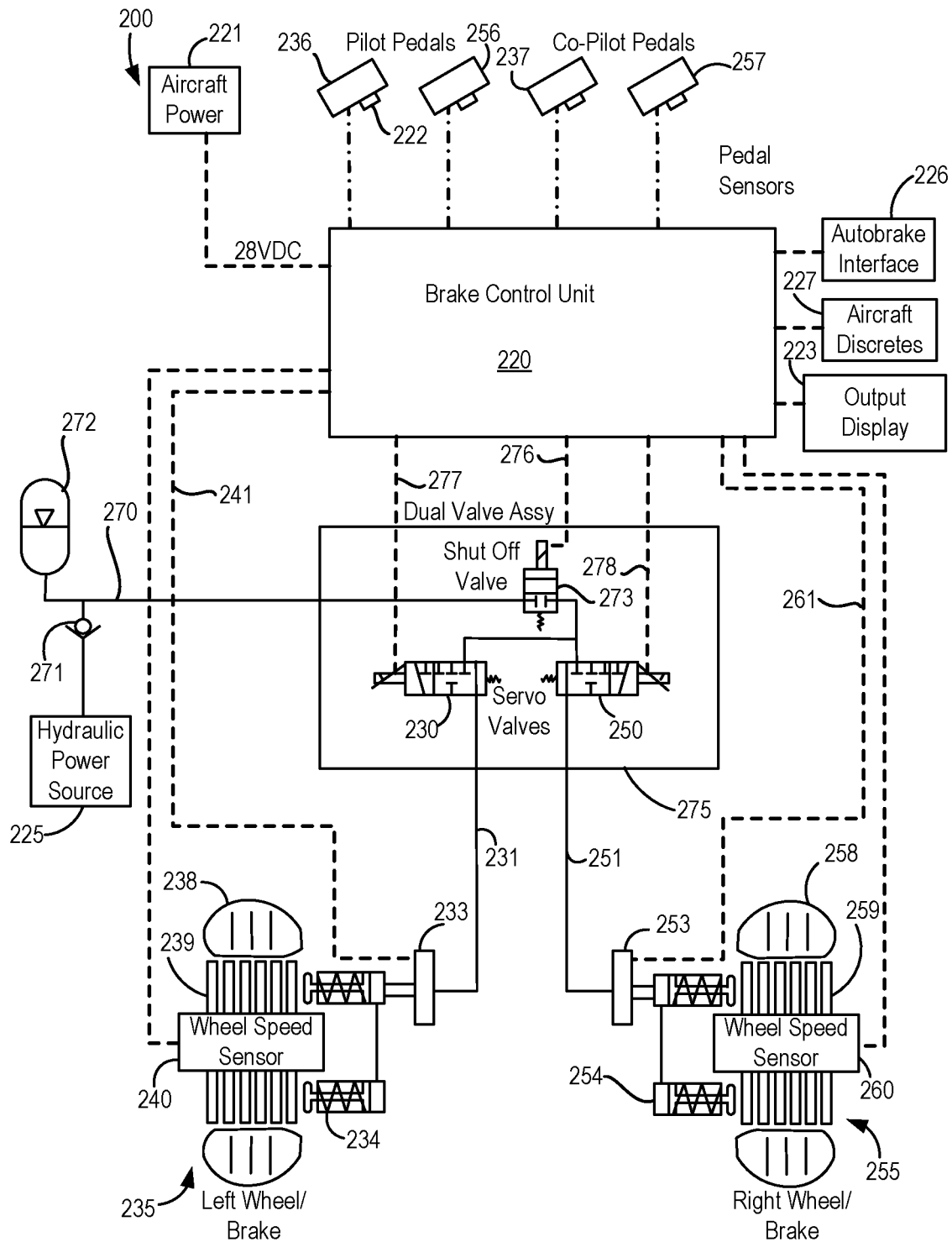
FIG. 2 is a functional diagram of a braking system, in accordance with various embodiments.

Referring now to FIG. 2, a braking system 200 is illustrated, in accordance with various embodiments. The braking system 200 includes a brake control unit (BCU) 220, similar to the BCU 120 described above with reference to FIGS. 1A and 1B, which is programmed to control the various braking functions described herein. In various embodiments, the braking system 200 enables an aircraft to brake, thereby slowing or stopping the aircraft when landing or taxiing on the ground. However, it will be appreciated that the braking system 200 may also be used in connection with other types of vehicles without departing from the scope of the disclosure.

As described herein, the braking system 200 generally includes a hydraulic power source 225 acting through a left servo valve 230 to apply hydraulic pressure through a left hydraulic line 231 to apply a braking force to a left actuator 234 (or to a plurality of left actuators) of a left wheel and brake assembly 235. Similarly, the braking system 200 includes a right servo valve 250 configured to apply hydraulic pressure through a right hydraulic line 251 to apply a braking force to a right actuator 254 (or to a plurality of right actuators) of a right wheel and brake assembly 255. A left pressure sensor 233 may be positioned in fluid communication with the left actuator 234 of the left wheel and brake assembly 235 and a right pressure sensor 253 may be positioned in fluid communication with the right actuator 254 of the right wheel and brake assembly 255. In various embodiments, the left pressure sensor 233 and the right pressure sensor 253 (each comprising a pressure sensor) and the left actuator 234 and the right actuator 254 (each comprising an actuator) may be common to both a primary braking system and a non-primary braking system that exist within the braking system 200. Further, while the disclosure makes general reference to left and right sides of a braking system, it will be appreciated that the disclosure is applicable to any number of wheel and brake assemblies (e.g., first, second and third wheel and brake assemblies) as well as to inboard and outboard wheel and brake assemblies.

During operation, the BCU 220 receives brake command signals from a left pilot brake pedal 236 and a right pilot brake pedal 256 or a left co-pilot brake pedal 237 and a right co-pilot brake pedal 257. The brake command signals from the left pilot brake pedal 236 and the right pilot brake pedal 256 or from the left co-pilot brake pedal 237 and the right co-pilot brake pedal 257 are indicative of a desired amount of braking. In addition, the BCU 220 receives control signals from an auto-brake interface 226 for performing auto-brake and rejected take-off (RTO) braking functions. The BCU 220 also receives a series of discrete control signals associated with the aircraft, generally represented as aircraft discretes 227, for providing braking control thereof. In various embodiments, the braking system 200 further includes an output device 223 (e.g., a display) coupled to the BCU 220. The output device 223 is configured to communicate information to the pilot or the co-pilot or to maintenance crew relating to the braking operations. For example, in various embodiments, the output device 223 includes a gauge, a speaker or a network access communication port configured to provide a message to a remote terminal. In various embodiments, the BCU 220 controls the output device 223 to output a health status of the braking system 200 or the various components thereof.

In various embodiments, the BCU 220 controls braking of the left wheel and brake assembly 235 and the right wheel and brake assembly 255, as noted above. The left wheel and brake assembly 235 includes a left wheel 238 (or a plurality of left wheels) and a left brake stack 239 (or a plurality of left brake stacks). The left actuator 234 (or a plurality of left actuators) may be provided for exerting a braking force (e.g., a compressive load) on the left brake stack 239 in order to brake the left wheel 238. Similarly, the right wheel and brake assembly 255 includes a right wheel 258 (or a plurality of right wheels) and a right brake stack 259 (or a plurality of right brake stacks). The right actuator 254 (or a plurality of right actuators) may be provided for exerting a braking force (e.g., a compressive load) on the right brake stack 259 in order to brake the right wheel 258. In various embodiments, the left wheel and brake assembly 235 and the right wheel and brake assembly 255 also include, respectively, a left wheel speed sensor 240 and a right wheel speed sensor 260, that provide wheel speed information to the BCU 220 for carrying out brake control operations.

In various embodiments of the braking system 200, the hydraulic power source 225 serves as a primary brake power supply within the braking system 200. In various embodiments, a primary hydraulic line 270 is connected to the hydraulic power source 225 via a check valve 271 and is also connected to an accumulator 272. In various embodiments, the primary hydraulic line 270 is input to a brake control module (BCM) 275 that is also comprised within the braking system 200. The BCM 275 includes a shutoff valve 273 through which the primary hydraulic line 270 supplies hydraulic fluid to the left servo valve 230 and the right servo valve 250. In this regard, the BCM 275 may be a dual valve assembly. In various embodiments, hydraulic fluid from the left servo valve 230 and the right servo valve 250 is, respectively, provided through the left hydraulic line 231 and the right hydraulic line 251 to apply the braking force to the left wheel 238 and the right wheel 258 during a braking operation.

During a braking operation, pressurized hydraulic fluid passes through the left hydraulic line 231 and the right hydraulic line 251 to the left actuator 234 and the right actuator 254, respectively. The shutoff valve 273 is open to the left hydraulic line 231 and the right hydraulic line 251, and the BCU 220 controls the level of hydraulic pressure that is delivered to the wheels via the left servo valve 230 and the right servo valve 250 acting through the left hydraulic line 231 and the right hydraulic line 251. In various embodiments, the shutoff valve 273, the left servo valve 230 and the right servo valve 250 are coil valves. In various embodiments, the shutoff valve 273 receives a shutoff valve control signal on a bus 276 from the BCU 220. Similarly, the left servo valve 230 may receive a left servo valve control signal on a left bus 277 from the BCU 220 and the right servo valve 250 may receive a right servo valve control signal on a right bus 278 from the BCU 220. The braking system 200 utilizes the shutoff valve 273 in-line with the left servo valve 230 and the right servo valve 250 to provide a level of redundancy that ensures a single valve failure cannot cause inadvertent braking. In order for the braking force to be applied by the braking system 200 to the left wheel and brake assembly 235 and the right wheel and brake assembly 255, the shutoff valve 273 is open along with at least one of the left servo valve 230 and the right servo valve 250. To provide a redundancy so that the brakes can be operated when commanded, each of the valves (shutoff and servo) may contain dual control coils with one coil for different dedicated channels in the BCU 220.

In various embodiments, the left pilot brake pedal 236 (or the left co-pilot brake pedal 237) provides a pedal deflection signal to the BCU 220 that is indicative of a degree of travel of the left pilot brake pedal 236 (or the left co-pilot brake pedal 237) and the amount of desired braking by the left wheel and brake assembly 235. In response to the pedal deflection signal, the BCU 220 generates the left servo valve control signal to be received by the left servo valve 230. The left servo valve control signal is then used by the left servo valve 230 to control the amount of hydraulic pressure that is applied to the left actuator 234. Similarly, the right pilot brake pedal 256 (or the right co-pilot brake pedal 257) may provide a pedal deflection signal to the BCU 220 that is indicative of a degree of travel of the right pilot brake pedal 256 (or the right co-pilot brake pedal 257) and the amount of desired braking by the right wheel and brake assembly 255. In response to the pedal deflection signal, the BCU 220 generates the right servo valve control signal to be received by the right servo valve 250. The right servo valve control signal is then used by the right servo valve 250 to control the amount of hydraulic pressure that is applied to the right actuator 254. In various embodiments, each brake pedal may have a corresponding transducer configured to provide the pedal deflection signal to the BCU 220. In various embodiments, the braking system 200 includes the left pressure sensor 233 for monitoring the hydraulic pressure in the left hydraulic line 231 and in the left actuator 234 and the right pressure sensor 253 for monitoring the hydraulic pressure in the right hydraulic line 251 and in the right actuator 254. As illustrated, the left pressure sensor 233 is configured to provide a feedback signal to the BCU 220 via a left pressure signal bus 241 and the right pressure sensor 253 is configured to provide a feedback signal to the BCU 220 via a right pressure signal bus 261. In addition, power to the BCU 220 is provided from an aircraft power source 221, such as, for example, a 28-Volt DC power source within the aircraft.

With continued reference to FIG. 2, the brake fill condition described above may be illustrated. For purposes of generality, the left side of the braking system 200 is used to describe the condition. Upon activation of the left pilot brake pedal 236 (or a brake pedal), a pedal deflection signal is generated by a transducer 222 coupled to the left pilot brake pedal 236 and directed to the BCU 220. As described above, the pedal deflection signal reflects a degree of travel (or a percentage deflection) of the brake pedal. The BCU 220 then generates a brake pressure command signal based on the pedal deflection signal. At the same time, the BCU 220 opens the shutoff valve 273 and provides an initial signal (e.g., an initial current level) to the left servo valve 230. The left servo valve 230 then activates and opens an amount sufficient to provide hydraulic fluid to the left actuator 234 at a rate that corresponds to the initial signal or the initial current level. Following the initial opening of the left servo valve 230 according to the initial current level, the BCU 220 steadily increases the current provided to the left servo valve 230 at a current ramp rate corresponding to the brake pressure command signal (see, e.g., FIG. 4). A measured pressure signal is generated by the left pressure sensor 233 and directed as feedback to the BCU 220. During the period of time when the left actuator 234 is filling with hydraulic fluid or the left brake stack 239 is translating toward engagement (i.e., the brake fill period or lag), the measured pressure signal will be low and likely significantly below the pressure corresponding with the pedal deflection signal or the brake pressure command signal. The BCU 220 will continue increasing the current level provided to the left servo valve 230 until a contact pressure threshold (e.g., 200 psi or ≈1400 kPa) is reached, where the contact pressure threshold is indicative of the actuator having engaged the brake stack (i.e., the end of the brake fill period or lag). Once the left pressure sensor 233 informs the BCU 220 that the brake pressure has reached the contact pressure threshold, the BCU 220 stops the steady increase of current provided to the left servo valve 230 and switches to a pressure control mode. It is during this mode switching—e.g., from a brake fill mode to a pressure control mode—that an overshoot in brake pressure occurs, leading to the unwanted grabbing or jerky brake performance described above.

Figure 3A:
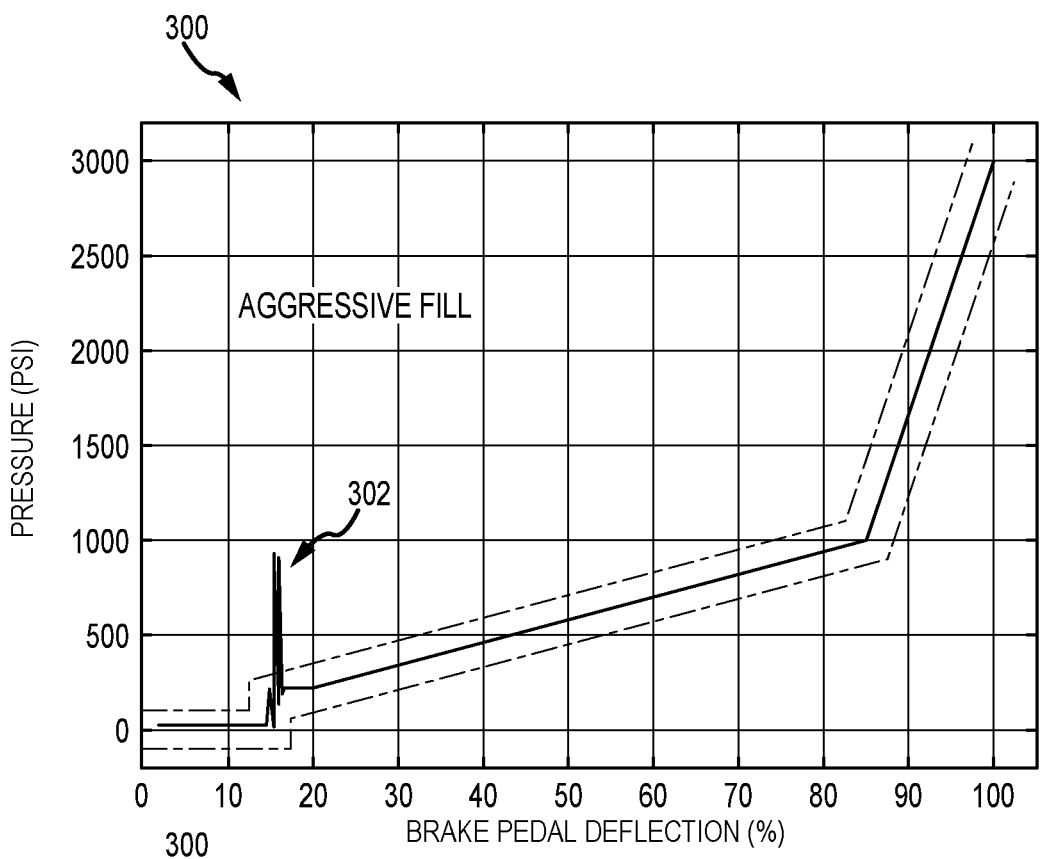
FIGS. 3A and 3B are graphs depicting actuator pressure as a function of brake pedal deflection, in accordance with various embodiments.
Figure 3B:
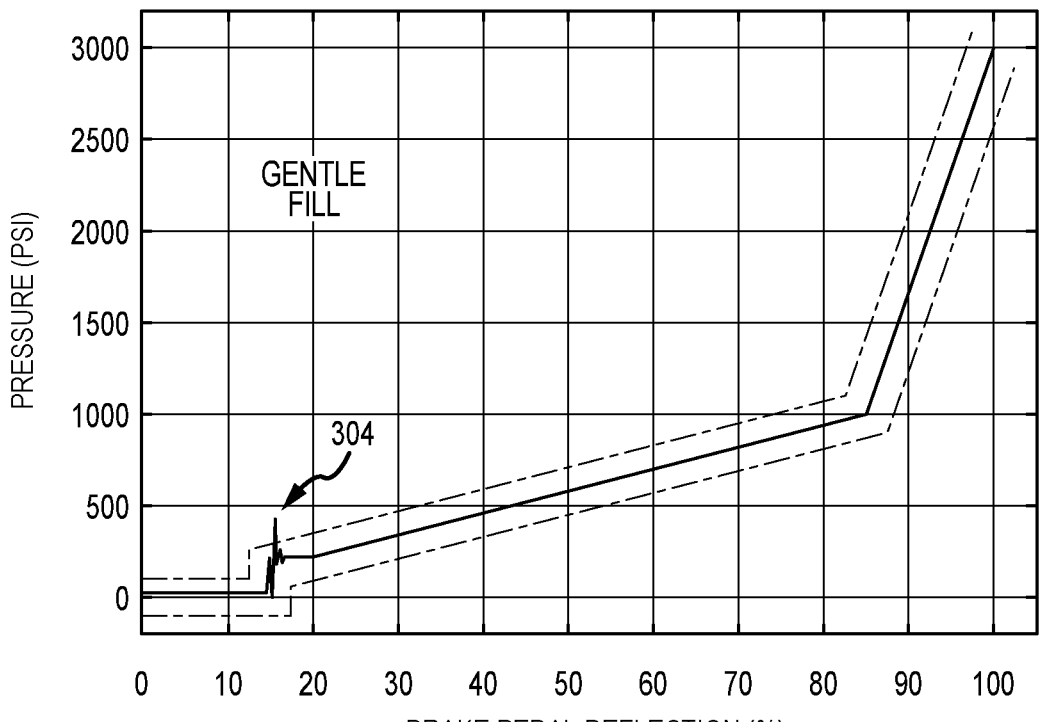

Referring now to FIGS. 3A and 3B, a pair of graphs 300 are provided that illustrate the effect of current ramp rate on brake fill overshoot. FIG. 3A represents an aggressive fill situation and an aggressive brake fill overshoot 302, where the current ramp rate received by a servo valve, such as, for example, the left servo valve 230 described above is high, relative to a gentle fill situation and a gentle brake fill overshoot 304 depicted in FIG. 3B. Generally speaking, the greater the rate at which the actuator is filled with hydraulic fluid, the more severe the grabbing or jerkiness on brake performance (e.g., the brake fill overshoot) at the termination of the brake fill. Referring to FIG. 3A, for example, as the brake pedal is deflected, typically there is no braking between zero percent (0%) and fifteen percent (15%) of pedal deflection. Once the pedal deflection exceeds 15% deflection, the shut off valve is opened and the servo valve is opened at an initial current, followed by a steadily increasing current according to a current ramp rate, leading to an increase in fluid flow to the brake actuators. As illustrated, the aggressive brake fill overshoot 302 occurs at approximately 15% pedal deflection; the gentle brake fill overshoot 304 also occurs at approximately 15% pedal deflection. In various embodiments, the rate of opening of the servo valve is controlled by the current ramp rate (e.g., in milliamps/sec) applied to the servo valve. Referring still to FIGS. 3A and 3B, the value for the current ramp rate in FIG. 3A, resulting in an aggressive fill, is greater than the value for the current ramp rate in FIG. 3B, leading to a gentle fill. It is noted here that in instances where the brakes are rapidly applied (e.g., slammed on after landing), the effect of the brake fill overshoot illustrated in either of FIG. 3A or 3B will be minimized (or not felt) as the brake pressure (e.g., the pressure in the brake actuator) very rapidly reaches a high level that exceeds the level of the brake fill overshoot. On the other hand, during braking when taxiing, for example, the brake fill overshoot may be very apparent and undesirable as only minimal brake pressure, on the order of or below the brake fill overshoot, is desired.

Figure 4:
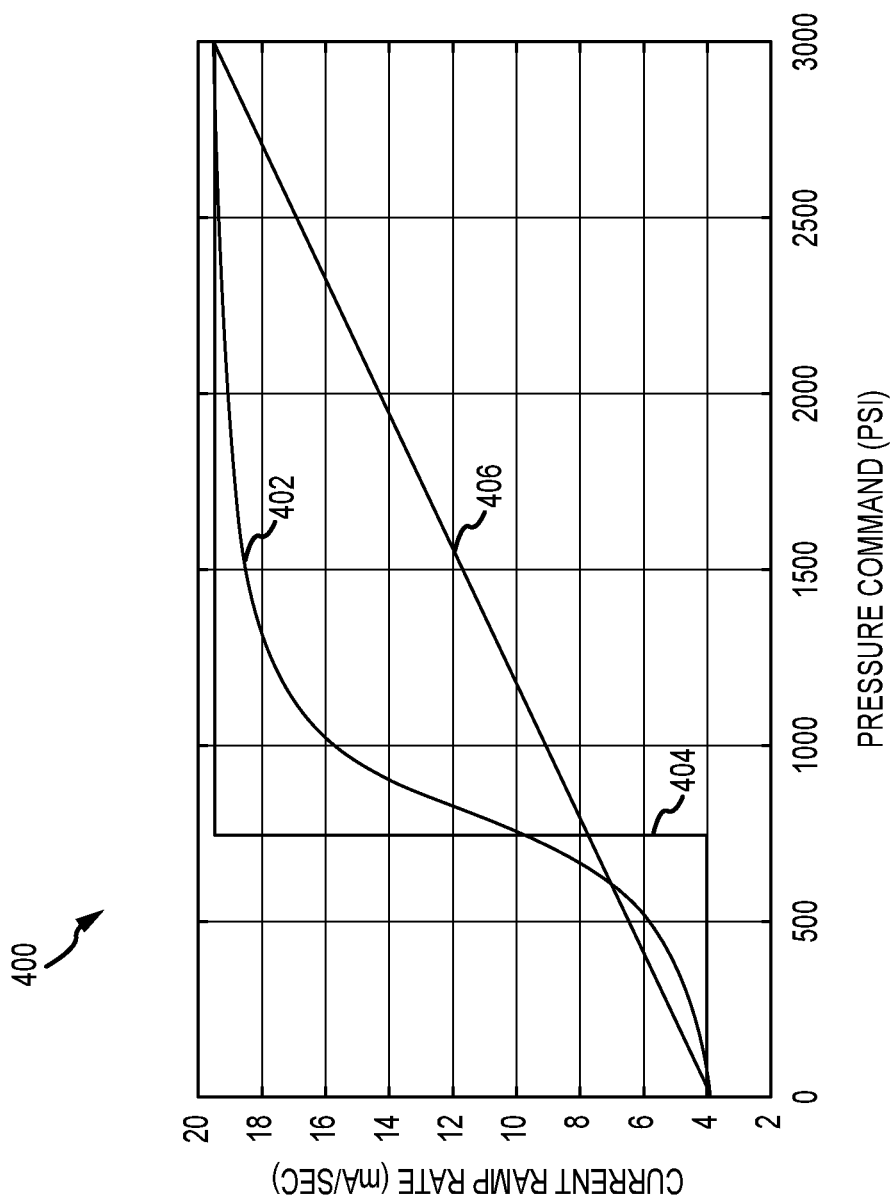
FIG. 4 is a graph depicting current ramp rate to a servo valve as a function of pressure command, in accordance with various embodiments.

Referring now to FIG. 4, a graph 400 of current ramp rate as a function of pressure command (or a curve of current ramp rate versus pressure command) is provided. The graph 400 represents programming or circuitry typically provided within a BCU, such as, for example, the BCU 220 described above with reference to FIG. 2. In various embodiments, the current ramp rate dictates the current directed to a servo valve, such as, for example, the left servo valve 230 described above. The current ramp rate is a function of the command pressure, such as, for example, the brake pressure command signal described above. Thus, where a gentle application of the brakes is desired, for example, during taxiing, the BCU commands a current to the servo valve that increases relatively slowly, which results in a gentle brake fill overshoot, similar to that illustrated in FIG. 3B. The gentle brake fill overshoot may be felt, but not at the undesirable level that would otherwise occur at a higher current ramp rate. On the other hand, where an aggressive application of the brakes is desired, for example, following landing, the BCU commands a current to the servo valve that increases relatively quickly. Here, as described above, an aggressive brake fill overshoot will result, but will not be apparent because of the otherwise concurrent rapid rise of pressure on the brakes, which exceeds the level of the brake fill overshoot.

As an example, where a pilot desires 500 psi (≈3,447 kPa) be applied at the brake actuators (≈40% pedal deflection in FIGS. 3A and 3B, or a first brake pedal deflection), which is typical of a brake application during taxi, a current is applied to the servo valve, starting with an initial current of, for example, sixteen milliamps (16 mA), followed by an increase in current at a current ramp rate of six milliamps per second (6 mA/sec) (or a first current ramp rate). Conversely, where a pilot desires 2000 psi (≈13,789 kPa) be applied at the brake actuators (≈93% pedal deflection in FIGS. 3A and 3B, or a second brake pedal deflection), which is typical of a brake application during landing, a current is applied to the servo valve, starting with an initial current of, for example, sixteen milliamps (16 mA), followed by an increase in current at a current ramp rate of nineteen (19) milliamps per second (or a second current ramp rate). Note that the first current ramp rate and the second current ramp rate will typically correspond to the brake pressure command signal described above with reference to FIG. 2 (e.g., a first brake pressure command signal and a second brake pressure command signal), and, similarly, are responsive to the pedal deflection signal also described above with reference to FIG. 2. In other words, the first current ramp rate may be considered responsive to a first input command pressure signal and the second current ramp rate may be considered responsive to a second input command pressure signal. The relatively slow first current ramp rate (associated with, for example, taxiing) will cause the actuators to be filled with hydraulic fluid or otherwise translated at a slower rate than will occur with the relatively high second current ramp rate (associated with, for example, landing) that will cause the actuators to be filled with hydraulic fluid or otherwise translated at a higher rate.

While a curve 402 having a smoothly varying and monotonically increasing function is provided, resulting in each value of current ramp rate being a distinct value, it will be appreciated that other curves are contemplated, with various shapes and numerical values (e.g., specific values for current ramp rate as a function of pressure command) being tailored to various applications. For example, a two-level step curve 404 may be made to approximate a step function, where a constant low current ramp rate and a constant high current ramp rate are selected, depending on the pressure command. Three or four or more step-levels are also contemplated, with each level representing a constant current ramp rate over a range of pressure commands. A straight-line curve 406 is also contemplated, representing a constant slope function (e.g., y=mx+b) over the applicable range of pressure command. Piecewise linear curves, having, for example, various segments defined by constant current ramp rates or constant slope rates may also be employed. Various other curves are also contemplated, such as, for example, curves defined by trigonometric functions. One such curve, similar to the curve 402, is parameterized by a hyperbolic tangent function, for example. Other such curves include the sigmoid function, the error function and the logistic function. One benefit of such curves or other relations between current ramp rate as a function of pressure command is to provide a relatively low current ramp rate at low command pressure (e.g., during taxiing) and a relatively high current rate at high command pressure (e.g., during landing), thereby minimizing undesirable effects of brake fill overshoot.

Figure 5:
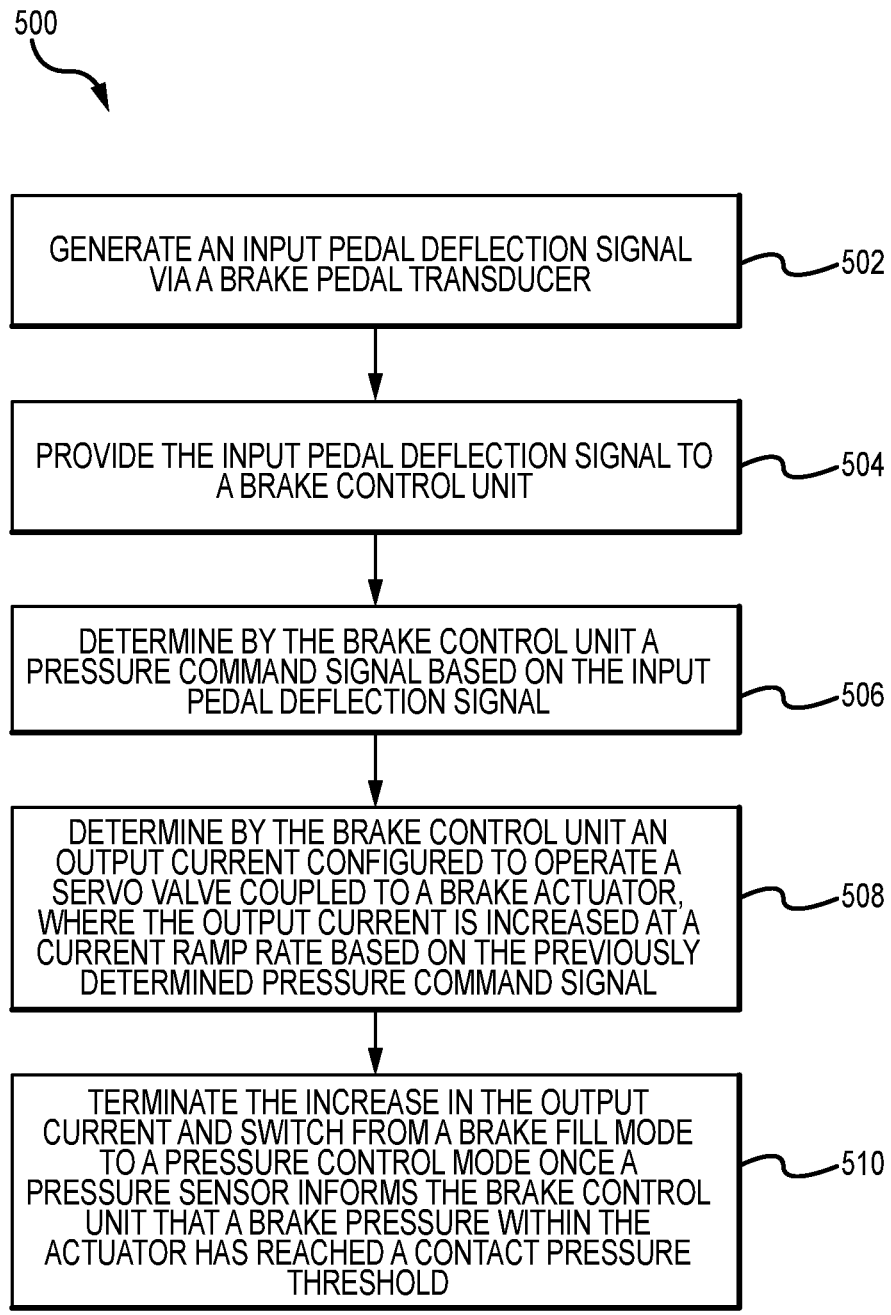
FIG. 5 describes a method of operating a brake system, in accordance with various embodiments.

Referring now to FIG. 5, a method 500 of operating a braking system is described with reference to the following steps. A first step 502 includes generating a pedal deflection signal (or a brake pedal deflection signal) via a brake pedal or a transducer connected to the brake pedal. A second step 504 includes providing the pedal deflection signal to a brake control unit. A third step 506 includes determining by the brake control unit a pressure command signal (or a brake pressure command signal) based on the pedal deflection signal. A fourth step 508 includes determining by the brake control unit an output current configured to operate a servo valve coupled to a brake actuator, where the output current is increased at a current ramp rate based on the previously determined pressure command signal; as described above, an initial current is generally provided prior to increasing the output current at the current ramp rate. As illustrated in FIG. 4, the current ramp rate is a function of the pressure command signal and, accordingly, may represent one of a first current ramp rate or a second current ramp rate (or any number of current ramp rates) that represent distinct values on a curve of current ramp rate versus pressure command. A fifth step 510 includes terminating the increase in the output current and switching from a brake fill mode to a pressure control mode once a pressure sensor informs the brake control unit that a brake pressure within the actuator has reached a contact pressure threshold.

Although described chiefly in the context of a hydraulic brake system, it will be appreciated that aspects of the disclosure may be applied to electric brakes as well. For example, with an electric brake, a brake fill-like condition can occur when a brake actuator is running clearance prior to engaging a brake stack. This clearance take-up produces provides essentially the same effect as a brake fill condition in a hydraulic brake and can be minimized as described above by sensing the condition and scaling the current ramp rate. Accordingly, as used in this description, the terms power or power source includes a hydraulic power source and power, an electric power source and power, or a pneumatic power source and power. In the context of a hydraulic or a pneumatic system, an effect resulting from power supplied to an actuator includes hydraulic or pneumatic pressure. In the context of an electric system, an effect of power supplied to an actuator includes a magnetic field.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A braking system, comprising:
   a brake stack;
   an actuator configured to apply a compressive load to the brake stack;
   a servo valve coupled to a power source and to the actuator; and
   a brake control unit configured to operate the servo valve at a current ramp rate in response to a pedal deflection signal,
   wherein the current ramp rate is determined via a relationship between the current ramp rate and a brake pressure command signal, wherein the current ramp rate is a first current ramp rate in response to the pedal deflection signal being below a first threshold and the current ramp rate is a second current ramp rate in response to the pedal deflection signal being above a second threshold and
   wherein the servo valve is opened an initial constant value according to an initial constant current, followed by a temporally increasing value according to a temporally increasing current dictated by the current ramp rate.

2. The braking system of claim 1, wherein the relationship provides distinct values for the current ramp rate on a curve of the current ramp rate versus the brake pressure command signal.

3. The braking system of claim 2, wherein the curve of the current ramp rate versus the brake pressure command signal includes a smoothly varying function.

4. The braking system of claim 2, wherein the curve of the current ramp rate versus the brake pressure command signal includes a step function.

5. The braking system of claim 2, wherein the curve of the current ramp rate versus the brake pressure command signal includes a constant slope function.

6. The braking system of claim 1, wherein the pedal deflection signal is generated by a transducer connected to a brake pedal.

7. The braking system of claim 6, wherein the current ramp rate corresponds with the brake pressure command signal generated by the brake control unit.

8. The braking system of claim 7, wherein the pedal deflection signal is generated by the transducer connected to the brake pedal and the brake control unit is configured to convert the pedal deflection signal to the brake pressure command signal.

9. The braking system of claim 8, wherein a pressure sensor is coupled to the actuator and configured to provide a feedback signal to the brake control unit.

10. The braking system of claim 1, wherein the power source is at least one of a hydraulic power source, an electric power source and a pneumatic power source.

11. The braking system of claim 1, wherein the power source is a hydraulic power source.

12. A method of operating a braking system, comprising:
    generating a pedal deflection signal via a brake pedal;
    providing the pedal deflection signal to a brake control unit;
    determining by the brake control unit a brake pressure command signal based on the pedal deflection signal; and
    determining by the brake control unit an output current configured to operate a servo valve coupled to a brake actuator and to a power source,
    wherein the output current is increased at a current ramp rate based on the brake pressure command signal, wherein the current ramp rate is a first current ramp rate in response to the pedal deflection signal being below a first threshold and the current ramp rate is a second current ramp rate in response to the pedal deflection signal being above a second threshold and
    wherein the servo valve is opened an initial constant value according to an initial constant current, followed by a temporally increasing value according to a temporally increasing current dictated by the current ramp rate.

13. The method of claim 12, wherein the current ramp rate is determined via a relationship between the current ramp rate and the brake pressure command signal.

14. The method of claim 13, wherein the relationship provides distinct values for the current ramp rate on a curve of the current ramp rate versus the brake pressure command signal.

15. The method of claim 14, wherein the pedal deflection signal is generated by a transducer connected to the brake pedal in response to a brake pedal deflection.

16. The method of claim 15, wherein the pedal deflection signal is one of a first pedal deflection signal or a second pedal deflection signal generated by the transducer connected to the brake pedal in response to a first brake pedal deflection or a second brake pedal deflection and wherein the current ramp rate corresponds with one of a first brake pressure command signal or a second brake pressure command signal generated by the brake control unit in response to the first brake pedal deflection or the second brake pedal deflection.

17. The method of claim 16, wherein a pressure sensor is coupled to the brake actuator and configured to provide a feedback signal to the brake control unit.

18. The method of claim 17, wherein the power source is a hydraulic power source.

19. A brake control unit comprising a tangible, non-transitory memory and a processor, the tangible, non-transitory memory having instructions stored thereon that, in response to execution by the processor, cause the brake control unit to perform operations comprising:
receiving a pedal deflection signal generated in response to a deflection of a brake pedal;
determining a brake pressure command signal based on the pedal deflection signal; and
determining an output current configured to operate a servo valve coupled to a brake actuator and to a power source,
wherein the output current is increased at a current ramp rate based on the brake pressure command signal, wherein the current ramp rate is a first current ramp rate in response to the pedal deflection signal being below a first threshold and the current ramp rate is a second current ramp rate in response to the pedal deflection signal being above a second threshold and
wherein the servo valve is opened an initial constant value according to an initial constant current, followed by a temporally increasing value according to a temporally increasing current dictated by the current ramp rate.

20. The brake control unit of claim 19, wherein the current ramp rate is determined via a relationship between the current ramp rate and the brake pressure command signal, the relationship providing distinct values for the current ramp rate on a curve of the current ramp rate versus the brake pressure command signal.

* * * * *